(12) United States Patent
Park et al.

(10) Patent No.: US 9,209,671 B2
(45) Date of Patent: Dec. 8, 2015

(54) STATOR MODULE AND MOTOR INCLUDING THE SAME

(75) Inventors: Tae-Sang Park, Suwon-si (KR);
Hong-Soon Choi, Sangju-si (KR);
Won-Ho Kim, Hwaseong-si (KR)

(73) Assignees: SAMSUNG ELECTRONICS CO., LTD., Suwon-si (KR); Kyungpook National University Industry-Academic Cooperation Foundation, Daegu-si (KR)

( * ) Notice: Subject to any disclaimer, the term of this patent is extended or adjusted under 35 U.S.C. 154(b) by 558 days.

(21) Appl. No.: 13/590,691

(22) Filed: Aug. 21, 2012

(65) Prior Publication Data

US 2013/0207504 A1    Aug. 15, 2013

(30) Foreign Application Priority Data

Feb. 10, 2012  (KR) .................. 10-2012-0013955

(51) Int. Cl.
*H02K 23/44*    (2006.01)
*H02K 21/16*    (2006.01)

(52) U.S. Cl.
CPC ............ *H02K 21/16* (2013.01); *H02K 2201/06* (2013.01); *H02K 2213/09* (2013.01)

(58) Field of Classification Search
CPC ......... H02K 16/04; H02K 3/15; H02K 21/16; H02K 2213/09; H02K 2201/06
USPC ................................. 310/112–114
See application file for complete search history.

(56) References Cited

U.S. PATENT DOCUMENTS

| | | | | |
|---|---|---|---|---|
| 4,785,213 A | * | 11/1988 | Satake | 310/116 |
| 4,920,293 A | * | 4/1990 | Kanda | 310/116 |
| 4,945,296 A | * | 7/1990 | Satake | 318/538 |
| 5,821,710 A | | 10/1998 | Masuzawa et al. | |
| 6,815,863 B1 | * | 11/2004 | Jack et al. | 310/254.1 |
| 7,388,310 B2 | * | 6/2008 | Abou-Akar et al. | 310/156.48 |
| 7,884,518 B2 | | 2/2011 | Blessing et al. | |

FOREIGN PATENT DOCUMENTS

| | | | | |
|---|---|---|---|---|
| JP | 11-0046471 A | | 2/1999 | |
| JP | 2005-057940 A | | 3/2005 | |
| JP | 2005-057942 A | | 3/2005 | |
| JP | 2005057942 A | * | 3/2005 | ............. H02K 16/04 |

OTHER PUBLICATIONS

JP 2005057942 A machine translation Oct. 28, 2014.*

* cited by examiner

*Primary Examiner* — Joshua Benitez-Rosario
*Assistant Examiner* — Leda Pham
(74) *Attorney, Agent, or Firm* — Sughrue Mion, PLLC (57) ABSTRACT

A stator module and a motor including the stator module are provided. The motor includes a stator and a stator module. The rotor includes a rotor core and a plurality of rotor poles arranged around a circumference of the rotor core, each generating a magnetic flux. The stator module includes a first stator and a second stator disposed coaxially with each other, each being rotatable in a circumferential direction and each having a coil wound thereon, and a rotation driving unit which controls a rotation of the first stator and the second stator through the same angle in opposite directions, thereby controlling a flux linkage of a rotor according to the rotational angle of each of the first stator and the second stator.

15 Claims, 9 Drawing Sheets

STATOR MODULE AND MOTOR INCLUDING THE SAME

CROSS-REFERENCE TO RELATED APPLICATION

This application claims priority under 35 U.S.C. §119(a) from Korean Patent Application No. 10-2012-0013955, filed on Feb. 10, 2012, in the Korean Intellectual Property Office, the entire disclosure of which is incorporated herein by reference for all purposes.

BACKGROUND

1. Field

Apparatuses consistent with exemplary embodiments relate to a motor used to convert electric energy into mechanical energy for various fields including electric automobile and home appliance.

2. Description of the Related Art

Hybrid vehicles and electric vehicles have gained more popularity due to harmful environmental effects from the air pollution and an increasing shortage of fossil fuels. A hybrid vehicle mainly uses an internal-combustion engine to generate power and uses an electric motor as an auxiliary power source. An electric vehicle uses an electric motor as a main power source.

With the development of technologies for a battery and a motor, it is expected that electric vehicles, known as pollution-free cars, will substitute for "transition" vehicles, such as hybrid cars, since electric vehicles emit no pollutants or carbon dioxide while driving.

There are various requirements for operating a motor for the electric vehicle. When an electric vehicle ascends a hill, low-speed high-torque is required, whereas during high-speed driving, for example, on an expressway, high-speed low torque is required. In the case of a washing machine, for a washing operation with a tub loaded with laundry and water, low-speed high-torque is required, whereas high-speed low-torque is required for draining water from the tub.

The use of a permanent magnet synchronous motor has been recently increasing for use with electric automobiles and washing machines. A permanent magnet synchronous motor uses a permanent magnet for a rotor. When a maximum current equivalent to a current limit of the permanent magnet synchronous motor flows through a stator coil in a q-axis direction that is 90 degrees ahead of a d-axis of the permanent magnet of the rotor, it is possible to provide low-speed high-torque at high efficiency.

However, because during a high-speed operation, a counter electromotive force due to the permanent magnet exceeds a voltage limit of the motor, field weakening control is conducted in an electrical manner, whereby a q-axis current is reduced and a −d-axis current is fed to reduce air gap flux density of the motor. During such control process, the −d-axis current does not merely contribute to generation of motor torque, but only increases copper loss.

SUMMARY

According to an aspect of an exemplary embodiment, there is provided a stator module comprising: a first stator and a second stator disposed coaxially with each other, each being capable of rotating along a circumferential direction and having a coil wound thereon; and a rotation driving unit configured to rotate the first stator and the second stator at the same angle in opposite directions, thereby controlling a flux linkage of a rotor according to a rotational angle of each of the first stator and the second stator.

According to an aspect of another exemplary embodiment, there is provided a motor comprising: a rotor configured to comprise a rotor core and a plurality of rotor poles disposed along a circumferential direction of the rotor core, each generating a magnetic flux; and a stator module configured to comprise a first stator and a second stator disposed coaxially with each other, each being capable of rotating along a circumferential direction and having a coil wound thereon, and a rotation driving unit configured to rotate the first stator and the second stator at the same angle in opposite directions, thereby controlling a flux linkage of a rotor according to a rotational angle of each of the first stator and the second stator.

BRIEF DESCRIPTION OF THE DRAWINGS

These and/or other exemplary aspects will become apparent and more readily appreciated from the following description of exemplary embodiments, taken in conjunction with the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
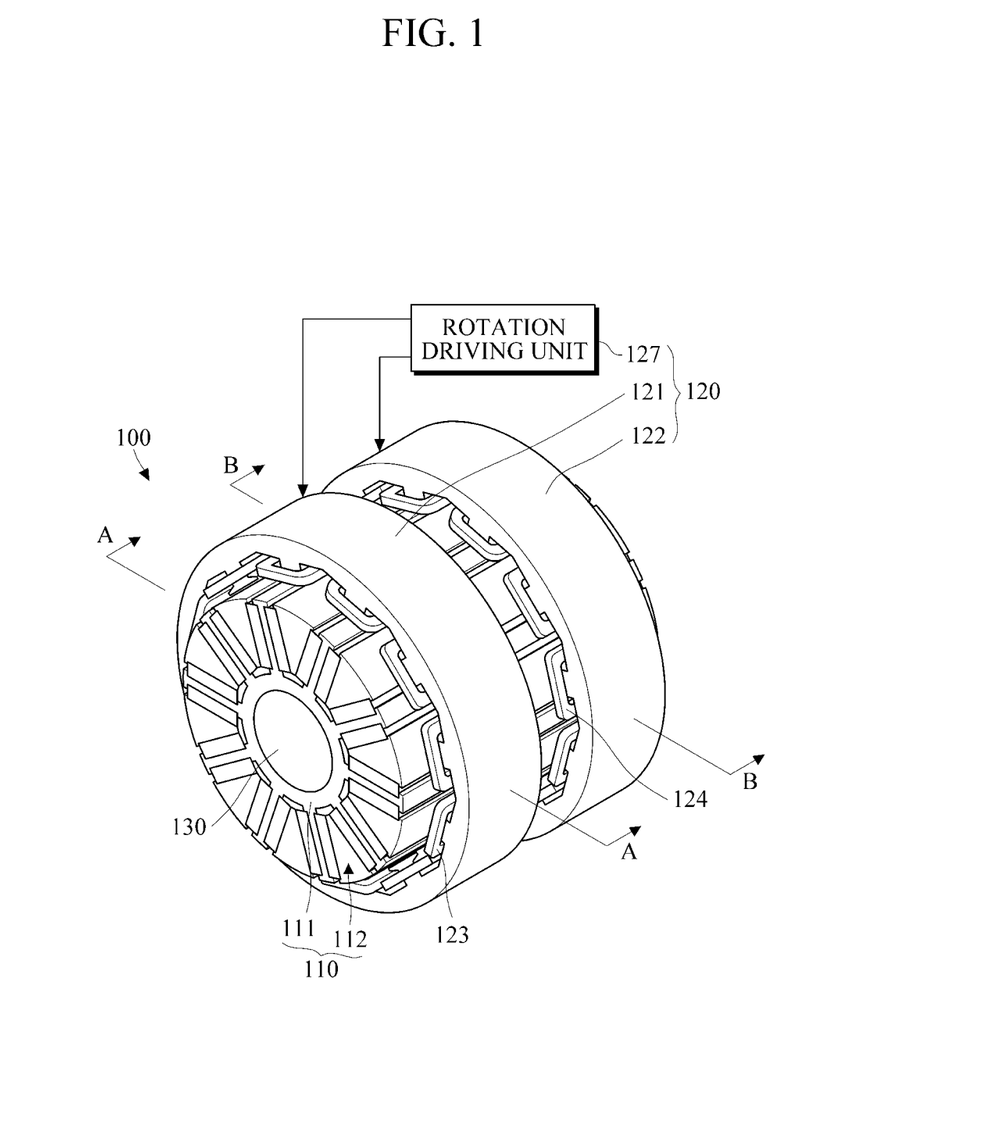
FIG. 1 is a diagram illustrating a perspective view of a motor according to an exemplary embodiment.
Figure 2:
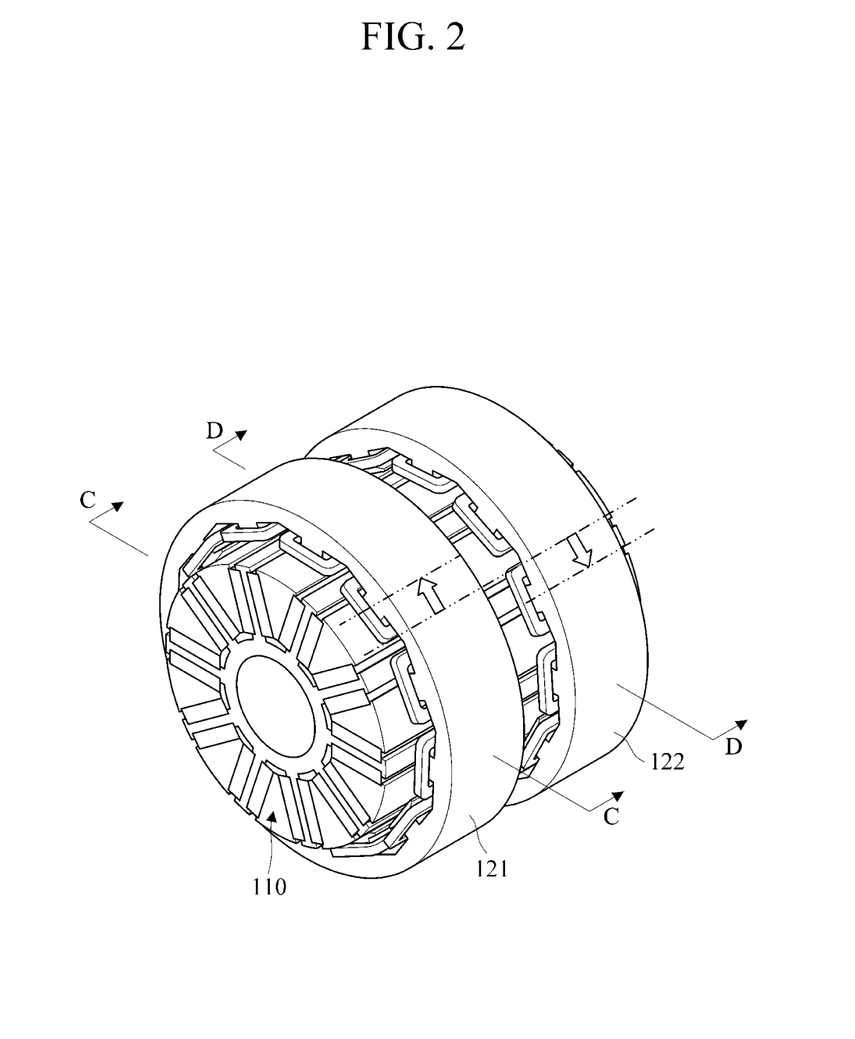
FIG. 2 is a diagram illustrating a perspective view of the motor of FIG. 1 when a first stator and a second stator turn.

FIG. 1 illustrates a perspective view of a motor according to an exemplary embodiment. FIG. 2 illustrates a perspective view of the motor of FIG. 1 when a first stator and a second stator turn.

Referring to FIGS. 1 and 2, a motor 100 may include a rotor 110 and a stator module 120.

The rotor 110 may include a rotor core 111 and a plurality of rotor poles 112. The rotor core 111 may have a through-hole passing through its center along a length direction. A shaft 130 may be inserted to be coupled into the through-hole of the rotor core 111. Accordingly, as the rotor core 111 turns, the shaft 130 rotates along with the rotor core 111. The shaft 130 may be made of a non-magnetic material. The rotor core 111 may be made of a soft magnetic material.

Each of the rotor poles 112 generates a magnetic flux, and the rotor poles 112 are arranged around a circumference of the rotor core 111. The rotor poles 112 may be spaced a predetermined distance apart from one another. There may be an even number of rotor poles 112. One of two neighboring rotor poles 112 may form an N-pole on an outer circumference of the rotor core 111 and the other may form an S-pole on the outer circumference of the rotor core 111. The rotor 110 may be coupled to the shaft 130, and divided into two parts corresponding to the respective first and second stators 121 and 122.

The stator module 120 may include a first stator 121, a second stator 122, and a rotation driving unit 127. The first stator 121 and the second start 122 are spaced apart from the rotor 110 and disposed coaxially with respect to each other. In the case of an inner-type rotor 110, each of the first stator 121 and the second stator 122 may be formed in a cylindrical shape with a hollow. The rotor 110 may be inserted into the hollows of the first and second stators 121 and 122, and be radially spaced apart from the first and the second stators 121 and 122.

The first and the second stators 121 and 122 may be operable to separately rotate along a circumferential direction of the rotor 110. The first stator 121 and the second stator 122, respectively, have coils 123 and 124 wound thereon. As a current flows through coils 123 and 124, the corresponding first and second stators 121 and 122 may generate a rotation magnetic field.

The coil 123 of the first stator 121 and the coil 124 of the second stator 122 may be connected in series with each other. For example, in the case where a 3-phase alternating current is applied to each of the coils 123 and 124, the a-phase, b-phase and c-phase of the coil 123 of the first stator 121 may be, respectively, connected to the a-phase, b-phase and c-phase of the coil of the second stator 122 in series.

The first stator 121 and the second stator 122 may have the same shape. For example, one stator may be divided into two same-size parts along a direction perpendicular to a center axis to form the first stator 121 and the second stator 122. The first stator 121 and the second stator 122 may be positioned a predetermined distance apart from each other.

The rotation driving unit 127 may drive the first stator 121 and the second stator 122 to turn through the same angle but in opposite directions. That is, the rotation driving unit 127 may rotate the first stator 121 at a position as shown in FIG. 3 to an angle of $\theta_M$ as shown in FIG. 5, and simultaneously rotate the second stator 122 at a position as shown in FIG. 4 to an angle of $-\theta_M$ as shown in FIG. 6.

The rotation driving unit 127 may control a flux linkage of the rotor 110 according to the rotation angles of the first stator 121 and the second stator 122. For example, the rotation driving unit 127 may maintain the maximum flux linkage of the rotor 110 by arranging the first stator 121 and the second stator 122 as shown in FIGS. 3 and 4. In this state, the rotation driving unit 127 may reduce the flux linkage of the rotor 110 by rotating the first stator 121 to an angle of $\theta_M$ as shown in FIG. 5 and the second stator 122 to an angle of $-\theta_M$ as shown in FIG. 6.

Figure 3:
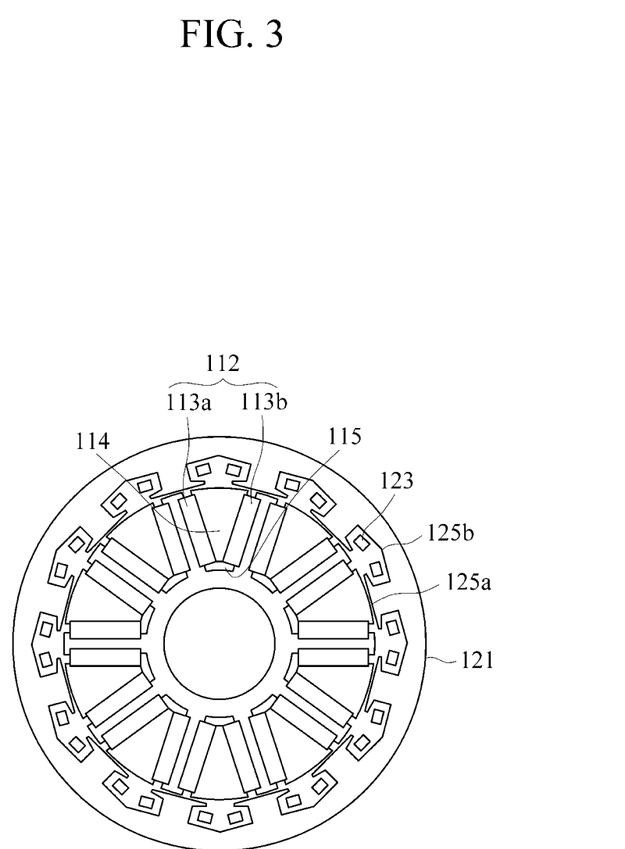
FIG. 3 is a diagram illustrating a cross-sectional view taken along A-A line in FIG. 1.
Figure 4:
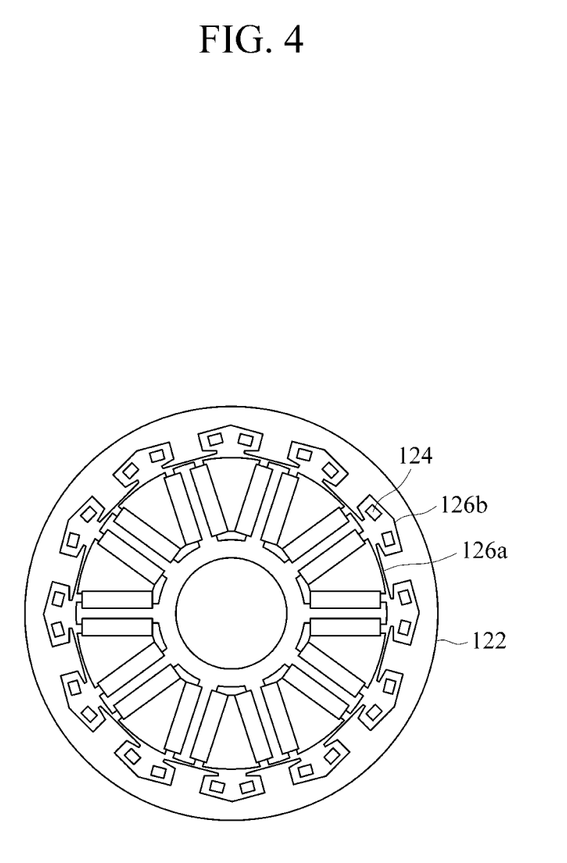
FIG. 4 is a diagram illustrating a cross-sectional view taken along B-B line in FIG. 1.

During a low-speed operation of the motor 100, the rotation driving unit 127 may maintain the first stator 121 and the second stator 122 to be arranged as shown in FIGS. 3 and 4. Because the flux linkage of the rotor 110 is maximized at this state, the motor 100 enables a high-efficiency, low-speed-high-torque operation.

Figure 5:
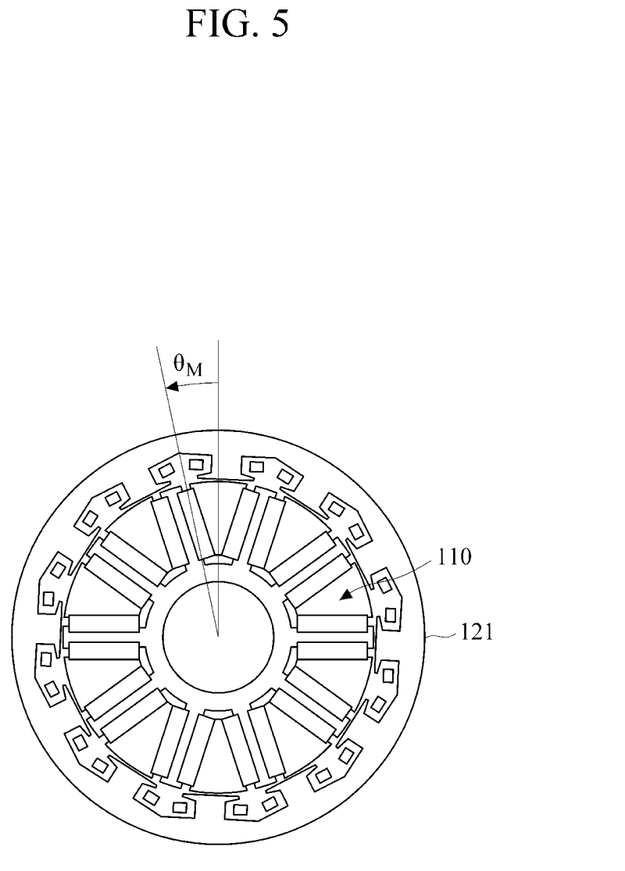
FIG. 5 is a diagram illustrating a cross-sectional view taken along C-C line in FIG. 2.
Figure 6:
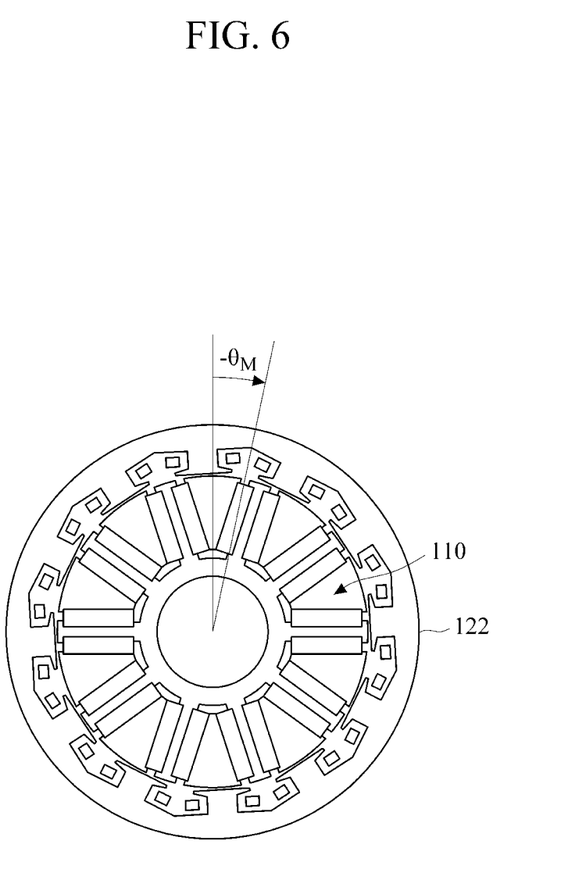
FIG. 6 is a diagram illustrating a cross-sectional view taken along D-D line in FIG. 2.

In addition, during a high-speed operation of the motor 100, the rotation driving unit 127 may rotate the first stator 121 to an angle of $\theta_M$ as shown in FIG. 5 and the second stator 122 to an angle of $-\theta_M$ as shown in FIG. 6. Because the flux linkage of the rotor 110 is reduced during this state, the motor 100 enables to operate at high speed without help of field weakening control in an electrical manner.

Various modification of the rotation driving unit 127 may be possible as long as it can rotate the first and second stators 121 and 122. For example, the rotation driving unit 127 may include a rotating motor and a gear assembly to transfer a rotating force of the rotating motor to the first and second stators 121 and 122.

Figure 7:
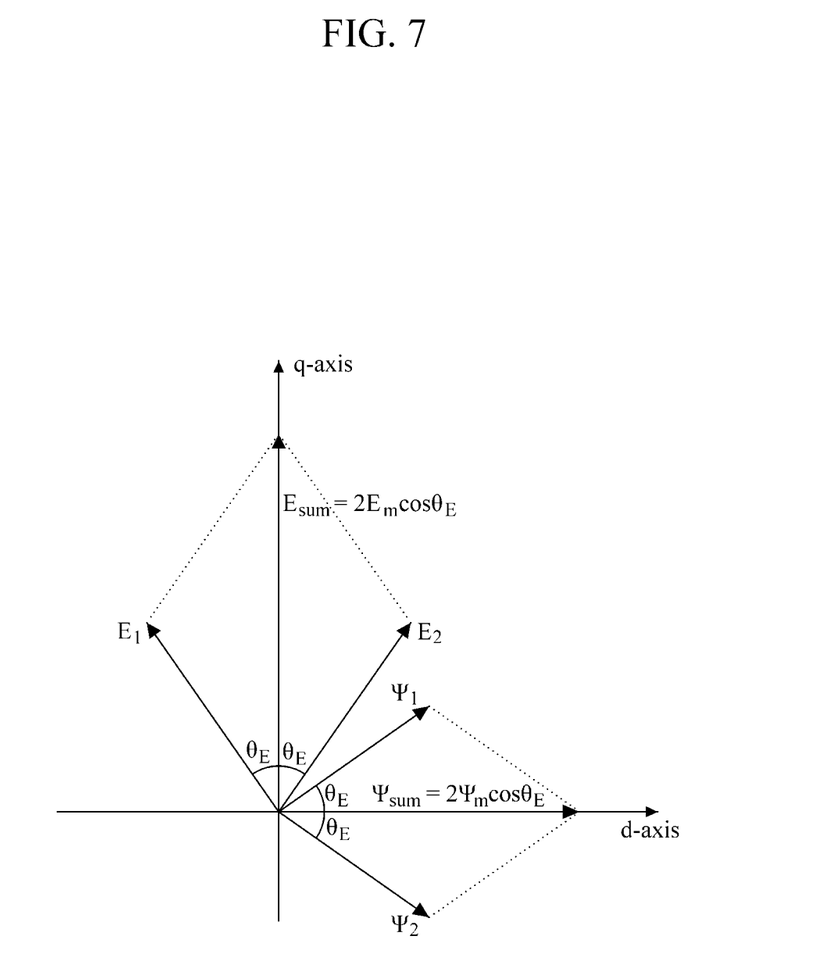
FIG. 7 is a vector diagram for explaining the principle of the reduction of the flux linkage by the rotation of the first and second stators.
Figure 8:
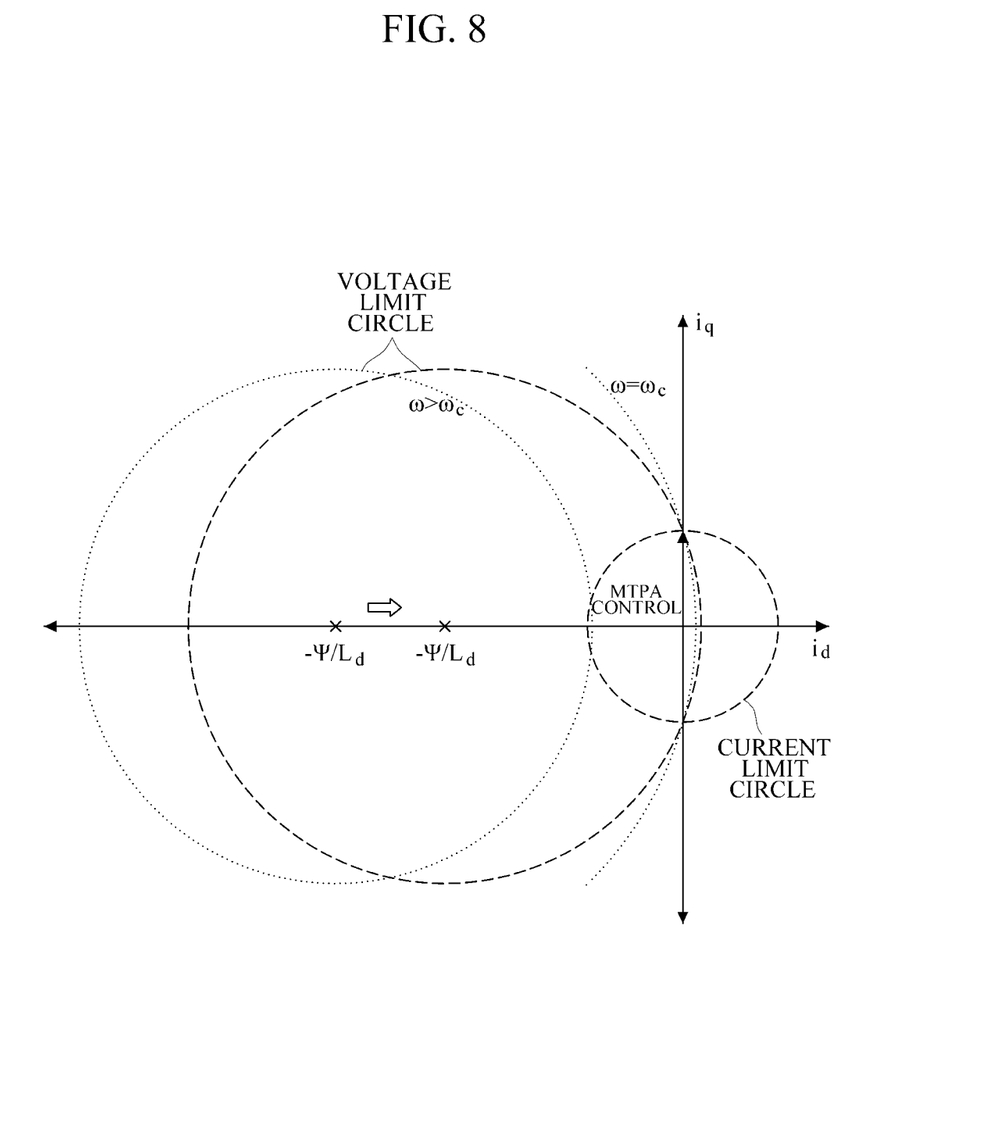
FIG. 8 is a graph plotting a change of a voltage limit circle on a current plane according to a reduction in a flux linkage.

Principles of the reduction of the flux linkage of the rotor 110 and the high-speed operation of the motor 100 by the rotation of the first stator 121 and the second stator 122 will be described with reference to FIGS. 7 and 8. FIG. 7 illustrates a vector diagram for explaining the principle of the reduction of the flux linkage by the rotation of the first and second stators 121 and 122. FIG. 8 illustrates a graph plotting a change of a voltage limit circle on a current plane according to a reduction in a flux linkage. When the first stator 121 rotates at an angle of $\theta_M$ and the second stator 122 rotates at an angle of $-\theta_M$ in opposite directions with respect to each other, a vector sum $\Psi_{sum}$ of a flux linkage $\Psi_1$ due to the first stator 121 and a flux linkage $\Psi_2$ due to the second stator 122 is represented as $\Psi_{sum}=(\Psi_1+\Psi_2)\cos\theta_e$ as shown in FIG. 7. Given $\Psi_1$ and $\Psi_2$ are the same in magnitude as $\Psi_m$, the vector sum can be represented as $\Psi_{sum}=2\Psi_m \cos\theta_E$, where $\theta_E$ represents an electrical angle, which can be obtained by an equation, $\theta_E=\theta_M \times P_N/2$. $P_N$ denotes a pole number. $\Psi_m$ denotes a maximum flux linkage.

As shown above, $\Psi_{sum}$ is obtained by the product of $\cos\theta_E$ and $\Psi_m$, and it is thus understood that the flux linkage is reduced when the first stator 121 rotates at an angle of $\theta_M$ and the second stator 122 rotates at an angle of $-\theta_M$ in opposite directions with respect to each other.

In addition, $\Psi_{sum}$ can be arranged on a d-axis, and there is, thus, no need of current phase control, which contributes to simplifying a control algorithm and structure of an inverter.

Further, when the first stator 121 rotates at an angle of $\theta_M$ and the second stator 122 rotates at an angle of $-\theta_M$ in opposite directions, a vector sum $E_{sum}$ of a counter electromotive force $E_1$ due to the first stator 121 and a counter electromotive force $E_2$ due to the second stator 122 is represented as $E_{sum}=(E_1+E_2)\cos\theta_E$. Given $E_1$ and $E_2$ are the same in magnitude as $E_m$, the vector sum $E_{sum}$ can be represented as $E_{sum}=2 E_m \cos\theta_E$. Here, $E_m$ represents a maximum counter electromotive force. Since $E_{sum}$ is obtained by a product of $\cos\theta_E$ and $E_m$, it may be understood that the counter electromotive force is reduced when the first stator 121 rotates at an angle of $\theta_M$ and the second stator 122 rotates at an angle of $-\theta_M$ in opposite directions. Thus, a high-speed field weakening is feasible.

Referring to FIG. 8, the motor can be driven by maximum torque per ampere (MTA) control in a shared region between a voltage limit circle and a current limit circle. Under the condition where a d-axis inductance $L_d$ is constant, as the flux linkage $\Psi$ increases, the center of the voltage limit circle becomes more distant from the center of the current limit circle. At this time, as an angular speed $\omega$ is lower, a radius of the voltage limit circle increases, and thus the shared region between the voltage limit circle and the current limit circle can be maintained. In this state, a low-speed high torque can be achieved.

On the contrary, as an angular speed ω rises, the radius of the voltage limit circle decreases, and accordingly, the voltage limit circle becomes farther from the current limit circle. At this time, as the flux linkage Ψ decreases, the center of the voltage limit circle moves toward the current limit circle, and thus the shared region between the voltage limit circle and the current limit circle can be maintained. In this state, a high-speed operation is feasible.

Thus, by arranging the first stator 121 and the second stator 122 in such a manner to maximize the flux linkage of the rotor 110, the motor 100 can operate at low speed, high torque, showing a high efficiency. In addition, by rotating the first stator 121 and the second stator 122 in such a manner to reduce the flux linkage of the rotor 110, the motor 100 can operate at high speed.

As described above, the motor 100 shown in the examples employs mechanical field weakening control to reduce the flux linkage of the rotor 110 by rotating the first stator 121 and the second stator 122, thereby reducing copper loss when compared to field weakening control in an electrical manner. Therefore, the efficiency of the motor 100 can be increased.

In addition, since the flux linkage is reduced by changing the positions of the first stator 121 and the second stator 122, there is no need of current phase control, and hence a design of a controller can be simplified and be manufactured at lower cost.

Referring to FIG. 8, a maximum speed of the motor 100 depends on the flux linkage. Thus, the maximum speed of the motor 100 may be set by controlling the flux linkage according to each rotational angle of the first stator 121 and the second stator 122.

Each rotational angle $\theta_M$ of the first stator 121 and the second stator 122 may be set by taking into account the angular speed of the motor 100. For example, the rotational angle $\theta_M$ of each of the first stator 121 and the second stator 122 may be obtained by Equation 1.

$$\theta_M = \frac{2}{P_N} \arctan\left(\frac{\sqrt{(L_q I)^2 - \left(\frac{V}{\omega_E}\right)^2}}{2\psi_m}\right), \quad (1)$$

where $P_N$ denotes a pole number, $L_q$ denotes a q-axis inductance, I denotes a current limit, V denotes a voltage limit, $\omega_E$ denotes an electrical angular speed, and $\Psi_m$ denotes a flux linkage of each of the first and second stators which are arranged.

The rotational angle $\theta_M$ of each of the first and second stators 121 and 122 may be obtained using Equation 1 by substituting an electrical angular speed corresponding to a value set as a maximum speed of the motor 100. Accordingly, it is possible to implement a motor that can operate in a desired speed range.

Referring back to FIGS. 3 to 6, the first stator 121 and the second stator 122 may, respectively, have teeth 125a and 126a formed at predetermined intervals around an inner circumference of the first and second stators 121 and 122. There may be formed slots 125b and 126b between neighboring teeth 125a and 126a. Coils 123 and 124 may be, respectively, provided to wind around the teeth 125a and 126a.

Each of the rotor poles 112 may include a pair of permanent magnets 113a and 113b. The permanent magnets 113a and 113b are spaced apart from each other and embedded in the rotor core 111. One ends of each of the permanent magnets 113a and 113b are positioned more inside the rotor core 111 than the other ends. The permanent magnets 113a and 113b extend along a rotational axis of the rotor core 111, each having a predetermined size of a cross-sectional area.

A space between ends of the permanent magnets 113a and 113b which are placed inside the rotor core 111 is narrower than a space between the other ends away from the rotor core 111, so that the pair of permanent magnets 113a and 113b can be disposed in a v-shaped. As another example, the permanent magnets 113a and 113b may be disposed in parallel to each other, and the arrangement of the permanent magnets 113a and 113b may vary.

The pair of permanent magnets 113a and 113b may be disposed having their N-poles or S-poles facing each other. The permanent magnets 113a and 113b may be made of a hard magnetic material.

A division core 114 may be interposed between the pair of permanent magnets 113a and 113b. Like the rotor core 111, the division core 114a may be made of a magnetic material. In addition, the rotor core 111 may have a connection portion 115 inside to connect one ends of the permanent magnets 113a and 113b. The connection portion 115 may be made of a non-magnetic material or be simply air. Consequently, the connection portion is able to prevent flux leakage. As another example, the connection portion 115 may have a center made of a magnetic material and the rest formed of a non-magnetic material or air.

Figure 9:
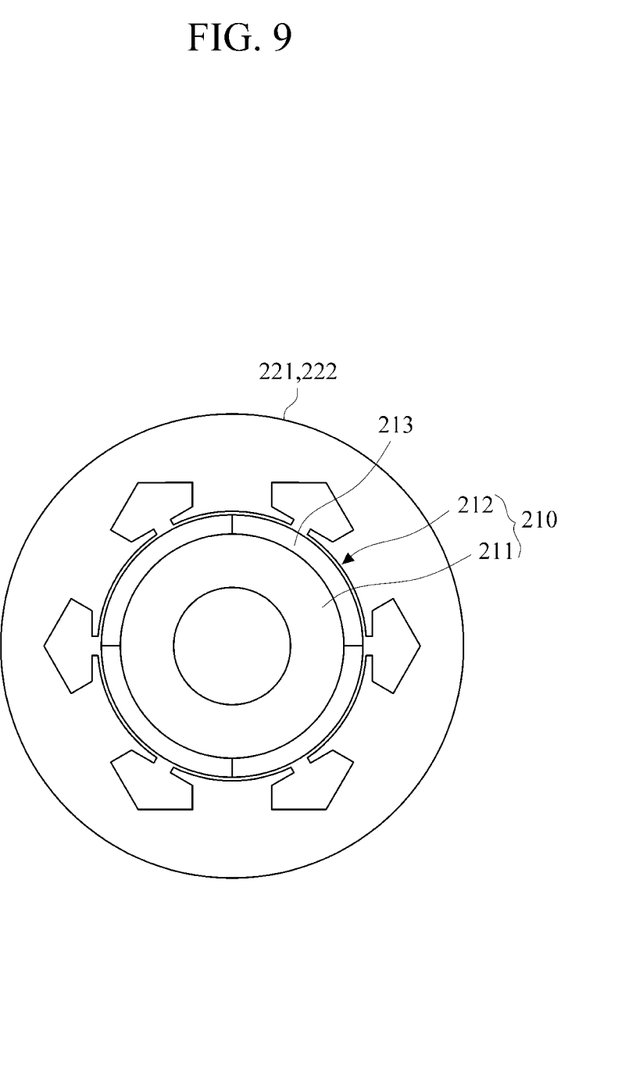
FIG. 9 is a diagram illustrating a cross-sectional view of a rotor included in a motor according to another exemplary embodiment.

FIG. 9 illustrates a cross-sectional view of another example of a rotor included in a motor.

Referring to FIG. 9, rotor poles 212 of a rotor 210 may each include a plurality of permanent magnets 213 attached on a surface of a rotor core 211. The permanent magnets 213 may be attached at intervals from one another on circumference of the rotor core 211. One outer side of one of two neighboring permanent magnets 213 may form an N pole, and one outer side of another permanent magnet 213 may form an S pole. The first stator 221 and the second stator 222 may be disposed around the rotor 210. The first stator 221 and the second stator 222 may be rotated in opposite directions to each other by the rotation driving unit 127 as described above. As another example, it may be possible to embed the permanent magnets 213 in the rotor core 211 along a circumferential direction of the rotor core 211.

The rotor 110 and 210 may be configured to generate a magnetic flux by use of an electromagnet, instead of the permanent magnet. Further, the first stator 121 and 221 and the second stator 122 and 222 may be configured to be suitable for an outer type rotor, and may not be limited to the aforementioned examples.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A stator module comprising:
   a first stator and a second stator disposed coaxially with the first stator with respect to a rotational axis, wherein each of the first stator and the second stator is rotatable in a circumferential direction around the rotational axis and each of the first stator and the second stator comprises a coil wound thereon; and a rotation driving unit which controls a rotation of the first stator and a rotation of the second stator, such that the second stator rotates through a rotational angle equal to a rotational angle through which the first stator rotates, and the second stator rotates in a direction opposite to a direction in which the first stator rotates, thereby controlling a flux linkage of a rotor according to the rotational angle of each of the first stator and the second stator.

2. The stator module of claim 1, wherein, in a low speed mode, the rotation driving unit drives the first stator and the second stator such that a maximum flux linkage of the rotor is achieved, and, in a high speed mode, the rotation driving unit drives the first stator and the second stator to rotate at the same angle in opposite directions, thus reducing a flux linkage of the rotor to a set value.

3. The stator module of claim 2, wherein the rotational angle $\theta_M$ of each of the first and second stators is determined based on an angular speed of a motor.

4. The stator module of claim 1, wherein a shape of the first stator is the same as a shape of the second stator.

5. The stator module of claim 1, wherein the coil on the first stator and the coil on the second stator are connected in series.

6. The motor of claim 1, wherein the rotation driving unit simultaneously rotates the first stator and the second stator so that the second stator is rotated in the direction opposite to the direction in which the first stator rotates in a substantially symmetrical manner.

7. The motor of claim 1, wherein the rotation driving unit rotates the second stator through the rotational angle equal to the rotational angle through which the first stator rotates to obtain an angular displacement between the first stator and the second stator.

8. A motor comprising:
a rotor comprising a rotor core and a plurality of rotor poles arranged around a circumference of the rotor core, wherein each of the plurality of rotor poles generates a magnetic flux; and
a stator module comprising a first stator and a second stator disposed coaxially with the first stator with respect to a rotational axis, wherein each of the first stator and the second stator is rotatable in a circumferential direction with respect to the rotational axis and each of the first stator and the second stator comprises a coil wound thereon, and a rotation driving unit which controls a rotation of each of the first stator and the second stator, such that the second stator rotates through a rotational angle equal to a rotational angle through which the first stator rotates, and the second stator rotates in a direction opposite to a direction in which the first stator rotates, thereby controlling a flux linkage of a rotor according to the rotational angle of each of the first stator and the second stator.

9. The motor of claim 8, wherein, in a low speed mode, the rotation driving unit drives the first stator and the second stator such that a maximum flux linkage of the rotor is achieved, and, in a high speed mode, the rotation driving unit drives the first stator and the second stator to rotate at the same angle in opposite directions, thus reducing a flux linkage of the rotor to a set value.

10. The motor of claim 9, wherein the rotational angle $\theta_M$ of each of the first and second stators is determined based on an angular speed of the motor.

11. The motor of claim 8, wherein a shape of the first stator is the same as a shape of the second stator.

12. The motor of claim 8, wherein the coil on the first stator and the coil on the second stator are connected in series.

13. The motor of claim 8, wherein the rotor poles are embedded in the rotor core and are spaced from one another, and each of the rotor poles comprises a pair of permanent magnets, each of the pair of permanent magnets having a first end disposed farther from the rotor core than a second end.

14. The motor of claim 13, herein each of the rotor poles further comprises:
a division core interposed between the pair of permanent magnets; and
a connection portion which connects one of the first and the second ends of each of the pair of permanent magnets.

15. The motor of claim 8, wherein each of the rotor poles comprises a permanent magnet attached to a surface of the rotor core.

* * * * *